United States Patent
Giri et al.

(10) Patent No.: US 12,272,371 B1
(45) Date of Patent: Apr. 8, 2025

(54) REAL-TIME TARGET SPEAKER AUDIO ENHANCEMENT

(71) Applicant: Amazon Technologies, Inc., Seattle, WA (US)

(72) Inventors: Ritwik Giri, Sunnyvale, CA (US); Shrikant Venkataramani, Champaign, IL (US); Jean-Marc Valin, Montreal (CA); Mehmet Umut Isik, Menlo Park, CA (US); Arvindh Krishnaswamy, Palo Alo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 634 days.

(21) Appl. No.: 17/364,805

(22) Filed: Jun. 30, 2021

(51) Int. Cl.
| | |
|---|---|
| *G06F 17/00* | (2019.01) |
| *G06N 20/00* | (2019.01) |
| *G10L 21/013* | (2013.01) |
| *G10L 21/0364* | (2013.01) |
| *G10L 21/038* | (2013.01) |

(52) U.S. Cl.
CPC .......... *G10L 21/0364* (2013.01); *G06N 20/00* (2019.01); *G10L 21/013* (2013.01); *G10L 21/038* (2013.01)

(58) Field of Classification Search
CPC . G10L 21/013; G10L 21/0364; G10L 21/038; G06N 20/00
USPC ........................................................ 704/226
See application file for complete search history.

(56) References Cited

U.S. PATENT DOCUMENTS

| | | | |
|---|---|---|---|
| 7,027,591 | B2 | 4/2006 | Cairns |
| 8,416,946 | B2 | 4/2013 | Chhetri et al. |
| 10,904,396 | B2 | 1/2021 | Hera et al. |
| 11,521,637 | B1 | 12/2022 | Valin et al. |
| 2018/0115824 | A1 | 4/2018 | Cassidy |
| 2019/0201657 | A1* | 7/2019 | Popelka ............. A61N 1/36038 |
| 2019/0318755 | A1 | 10/2019 | Tashev |
| 2020/0066296 | A1 | 2/2020 | Sargsyan |
| 2020/0152179 | A1* | 5/2020 | van Hout ................ G10L 15/22 |
| 2021/0125625 | A1 | 4/2021 | Huang |
| 2022/0122597 | A1* | 4/2022 | Ji ........................ G10L 21/0232 |
| 2022/0335953 | A1* | 10/2022 | Rikhye ................... G10L 15/22 |
| 2023/0419984 | A1* | 12/2023 | Uhle ....................... G10L 25/48 |

OTHER PUBLICATIONS

Ding Liu, et al., "Experiments on Deep Learning for Speech Denoising", In Proceedings of Fifteenth Annual Conference of the International Speech Communication Association, 2014, pp. 1-5.

(Continued)

*Primary Examiner* — Paul C McCord
(74) *Attorney, Agent, or Firm* — S. Scott Foster; Kowert, Hood, Munyon, Rankin & Goetzel, P.C.

(57) ABSTRACT

Real-time audio enhancement for a target speaker may be performed. An embedding of a sample of speaker audio is created using a trained neural network that performs voice identification. The embedding is then concatenated with the input features of a trained machine learning model for audio enhancement. The audio enhancement model can recognize and enhance a target speaker's speech in a real-time implementation, as the embedding is in the same feature space of the audio enhancement model.

20 Claims, 9 Drawing Sheets

(56) References Cited

OTHER PUBLICATIONS

Yong Xu, et al., "A Regression Approach to Speech Enhancement Based on Deep Neural Networks", IEEE/ACM Transactions on Audio, Speech, and Language Processing, vol. 23, No. 1, Jan. 2015, pp. 7-19.

Ke Tan, et al., "A Convolutional Recurrent Neural Network for Real-Time Speech Enchancement", Interspeech 2018, Sep. 2-6, 2018, pp. 1-5.

Arun Narayanan, et al., "Ideal Ratio Mask Estimation Using Deep Neural Networks for Robust Speech Recognition", IEEE, In Proceedings of International Conference on Acoustics, Speech and Signal Processing (ICASSP), 2013, pp. 7092-7096.

Yan Zhao, et al., "DNN-Based Enhancement of Noisy and Reverberant Speech", IEEE, In Proceedings of International Conference on Acoustics, Speech and Signal Processing (ICASSP), 2016, pp. 6525-6529.

Donald S. Williamson, et al., "Complex Ratio Masking for Monaural Speech Separation", IEEE/ACM Transactions on Audio Speech Language Processing, 24(3), Mar. 2016, pp. 483-492.

Santiago Pascual, et al., "SEGAN: Speech Enhancement Generative Adversarial Network", arXiv:1703.09452v3, Jun. 9, 2017, pp. 1-5.

Dario Rethage, et al., "A Wavenet for Speech Denoising", arXiv:1706.07162v3, Jan. 31, 2018, pp. 1-11.

Craig Macartney, et al., "Improved Speech Enhancement with the Wave-U-Net", arXiv:1811.11307v1, Nov. 27, 2018, pp. 1-5.

Jean-Marc Valin, "A Hybrid DSP/Deep Learning Approach to Real-Time Full-Band Speech Enhancement", arXiv:1709.08243v3, May 31, 2018, pp. 1-5.

John P. Princen, et al., "Analysis/Synthesis Filter Bank Design Based on Time Domain Aliasing Cancellation", IEEE Transactions on Acoustics, Speech, and Signal Processing, vol. ASSP-34, No. 5, Oct. 1986, pp. 1153-1161.

Hedwig Gockel, et al., "Asymmetry of masking between complex tones and noise: Partial loudness", The Journal of the Acoustical Society of America, 114(1), Jul. 2003, pp. 349-360.

D. Talkin. A robust algorithm for pitch tracking (RAPT). In Speech Coding and Synthesis, chapter 14, Elsevier Science, 1995, pp. 495; 497-518.

Ted Painter, et al., "Perceptual Coding of Digital Audio", in Proceedings of the IEEE, vol. 88, No. 4, Apr. 2000, pp. 451-513.

Kyunghyun Cho, et al., "On the Properties of Neural Machine Translation: Encoder-Decoder Approaches", arXiv:1409.1259v2, Oct. 7, 2014, pp. 1-9.

Yan Zhao, et al., "Late Reverberation Suppression Using Recurrent Neural Networks With Long Short-Term Memory", In Proceedings of International Conference on Acoustics, Speech and Signal Processing (ICASSP), IEEE, 2018, pp. 5434-5438.

Hakan Erdogan, et al., "Investiagtions on Data Augmentation and Loss Functions for Deep Learning Based Speech-Background Separation", Interspeech 2018, Sep. 2-6, 2018, pp. 1-5.

Juin-Hwey Chen, et al., "Adaptive Postfiltering for Quality Enhancement of Coded Speech", in IEEE Transactions on Speech and Audio Processing, vol. 3, No. 1, Jan. 1995, pp. 59-71.

Valentini Botinhao, et al., "Investigating RNN-based speech enhancement methods for noise-robust Text-to-Speech", In Proceedings of ISCA Speech Synthesis Workshop (SSW), 2016, pp. 146-152.

U.S. Appl. No. 17/668,297, filed Feb. 9, 2022, Jean-Marc Valin, et al.

Yangyang Xia, et al., Weighted Speech Distortion Losses for Neural-Network-Based Real-Time Speech Enhancement, arXiv:2001.10601v2. Feb. 12, 2020, pp. 1-5.

U.S. Appl. No. 17/037,498, filed Sep. 29, 2020, Jean-Marc Valin et al.

U.S. Appl. No. 17/037,515, filed Sep. 29, 2020, Mehmet Umut Isik et al.

Jean-Marc Valin, et al., "A PErceptually-Motivated Approach for Low-Complexity, Rea-Time Enhancement of Fullband Speech", arXiv:2008.04259v2, Aug. 27, 2020, pp. 1-5.

Yi Luo, "TASNET: Time-Domain Audio Separation Network for Real-Time, Single-Channel Speech Separation", arXiv:1711.00541v2, Apr. 8, 2018, pp. 1-5.

John R. Hershey, et al., "Deep clustering: Discriminative embeddings for segmentation and separation", arXiv:1508.04306v1, Aug. 18, 2015, pp. 1-10.

Morten Holbaek, et al., "Multi-talker Speech Separation with Utterance-level Permutation Invariant Trainingof Deep Recurrent Neural Networks", arXiv:1703.06284v2, Jul. 11, 2017, pp. 1-12.

Yi Luo, et al., "Conv-TasNet: Surpassing Ideal Time-Frequency Magnitude Masking for Speech Separation", IEEE/ACM Transactions on Audio, Speech and Language Processing, vol. 27, No. 8, Aug. 2019, pp. 1256-1266.

Efthymios Tzinis, et al., "Unspervised Deep Clustering for Source Separation: Direct Learning From Mixtures Using Spatial Informaiton", arXiv:1811.01531v2, Nov. 9, 2018, pp. 1-5.

Thilo von Neumann, et al., "All-Neural Online Source Separation, Counting, and Diarization for Meeting Analysis", arXiv:1902.07881v1, Feb. 21, 2019, pp. 1-5.

Desh Raj, et al., "Integration of Speech Separation, Diarization, and Recognition for Multi-Speaker Meetings: System Description, Comparison, and Anaylsis", arXiv:2011.02014v1, Nov. 3, 2020, pp. 1-8.

Quan Wang, et al., "VoiceFilter: Targeted Voice Separation by Speaker-Conditioned Spectrogram Masking", arXiv:1810.04826v6, Jun. 19, 2019, pp. 1-5.

Lin Wan, et al., "Generalized End-to-End Loss for Speaker Verification", arXiv:1710.10467v5, Nov. 9, 2020, pp. 1-5.

Seongkyu Mun, et al. "The Sound of My Voice: Speaker Representation Loss for Target Voice Separation", arXiv:1911.02411v2, Feb. 27, 2020, pp. 1-5.

Rongzhi Gu, et al., "Neural Spatial Filter: Target Speaker Speech Separation Assisted with Directional Information", Interspeech 2019, Sep. 15-19, 2019, Graz, Austria, pp. 1-5.

Tingle Li, et al., "Atss-Net: Target Speaker Separation via Attention-based Neural Network", arXiv:2005.09200v1, May 19, 2020, pp. 1-5.

Xiong Xiao, et al., "Speech Separation Using Speaker Inventory", IEEE, ASRU 2019, pp. 230-236.

Quan Wang, et al., "VoiceFilter-Lite: Streaming Targeted Voice Separation for On-Device Speech Recognition", arXiv:2009-04323v1, Sep. 9, 2020, pp. 1-5.

Chandan K. A. Reddy, et al., "The Interspeech 2020 Deep Noise Suppression Challenge: Datasets, Subjective Speech Quality and Testing Framework", arXiv preprint arXiv:2001.08662, 2020, pp. 1-5.

Aonan Zhang, et al., "Fully Surpervised Speaker Diarization", arXiv:1810.04719v7, Feb. 19, 2019, pp. 1-5.

Quan Wang, et al., "Speaker Diarization With LSTM", arXiv:1710.10468v6, Dec. 14, 2018, pp. 1-5.

Ye Jia, et al., "Transfer Learning from Speaker Verification to Multispeaker Text-To-Speech Synthesis", arXiv:1806.04558v4, Jan. 2, 2019, pp. 1-15.

Kaizhi Qian, et al., "AutoVC: Zero-Shot Voice Style Transfer with Only Autoencoder Loss", in Proceedings of the 36th International Conference on Machine Learning, PLMR 97, 2019, pp. 1-10.

Jean-Marc Valin, et al., "LPCNET: Improving Neural Speech Synthesis Through Linear Prediction", arXiv:1810.11846v2, Feb. 19, 2019, pp. 1-5.

Sebastian Braun, et al., "Data augmentation and loss normalization for deep noise suppression", arXiv:2008.06412v2, Sep. 24, 2020, pp. 1-8.

Shaojin Ding, et al., "Personal VAD: Speaker-Conditioned Voice Activity Detection", arXiv:1908.04284v4, Apr. 8, 2020, pp. 1-7.

Joon Son Chung, et al., "VoxCeleb2: Deep Speaker Recognition", arXiv: 1806.05622v2, Jun. 27, 2018, pp. 1-6.

Arsha Nagrani, et al., "VoxCeleb: a large-scale speaker identification dataset", arXiv:1706.08612v2, May 30, 2018, pp. 1-6.

Vassil Panayotov, et al., "Librispeech: an ASR Corpus Based on Public Domain Audio Books", 2015 IEEE international conference on acoustics, speech and signal processing (ICASSP). IEEE, 2015, pp. 1-5.

(56) References Cited

OTHER PUBLICATIONS

Umut Isik, et al., "PoCoNet: Better Speech Enhancement with Frequency-Positional Embeddings, Semi-Supervised Conversational Data, and Biased Loss", arXiv:2008-04470v1, Aug. 11, 2020, pp. 1-5.

Joachim Thiemann, et al., "Demand: a collection of multi-channel recordings of acoustic noise in diverse environments", Version 1.0, Jun. 9, 2013, In Proceedings Meetings Acoustic, pp. 1-6.

* cited by examiner

REAL-TIME TARGET SPEAKER AUDIO ENHANCEMENT

BACKGROUND

Over the past few years, audio enhancement methods (e.g., for recorded human speech) based on deep learning have greatly surpassed traditional methods based on spectral subtraction and spectral estimation. Many of these new techniques operate directly in the short-time Fourier transform (STFT) domain, resulting in a high computational complexity.

Figure 1:
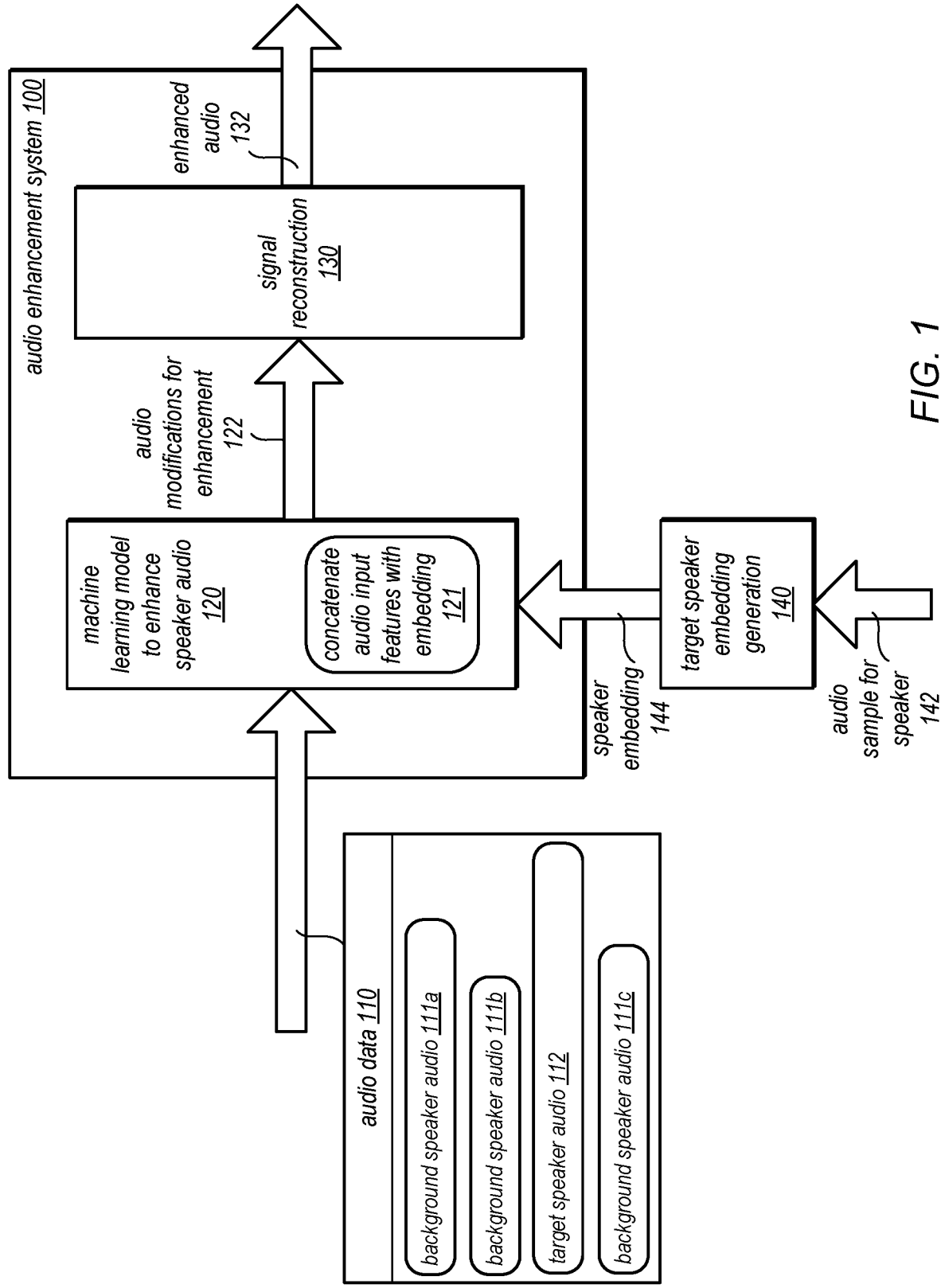
FIG. 1 illustrates a logical block diagram of real-time target speaker audio enhancement, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for real-time target speaker audio enhancement are described herein. With the ubiquitous presence of real-time audio communication systems, there has been a significant interest in speech enhancement algorithms that operate in real-time with low complexity. In the real world, a user (e.g., a target speaker) of these communication systems often finds themselves in the presence of competing background sounds. Audio enhancement techniques that enhance speech may be performed to extract a high-quality version of a target speaker's utterance from the mixture that contains the target speaker in addition to multiple competing ambient sounds. Considering the complexity of enhancing fullband (e.g., 48 kHz) speech mixtures, a perceptually motivated, low-complexity model, such as the example "PercepNet" model discussed in detail below, may deliver high-quality speech enhancement in real-time even while operating on less than 5% of a CPU core which comes with the cost of increasing network complexity.

To provide a speech enhancement technique that can be utilized by real-time audio enhancement techniques, like the PercepNet model, techniques for real-time target speaker audio enhancement may include: (i) identifying the target speaker amidst all the interfering sounds in the given mixture, and (ii) isolating and enhancing only the target speaker. Some techniques have used a pre-trained speaker embedder network that learns a discriminative speaker representation from the Mel spectrogram of an audio signal. These embeddings may then be used to condition the separation network and isolate only the target speaker. Despite the availability of several such techniques, these approaches have primarily focused on target source separation for non-real-time applications. The use of bidirectional recurrent layers and large convolutional layers increases the complexity of the models used to implement these techniques. Moreover, the non-causal nature of the convolutions and the bidirectional recurrent units makes these aforementioned approaches unsuitable for real-time, low-complexity applications.

In various embodiments, machine learning model-based audio enhancement techniques that provide a perceptually motivated approach to real-time, low-complexity target speaker enhancement, such as PercepNet, may utilize techniques for real-time target speaker audio enhancement. Real-time target speaker audio enhancement techniques may perform conditioning on the target speaker's voice or other audio enhancement techniques. This enables the machine learning model for audio enhancement to distinctly identify and enhance the target speaker's utterance while suppressing all the other interferences, even in the presence of multiple talkers or other speech-like sounds. Given a sample audio of the target speaker's voice, an offline, discriminative embedding representation may be generated that captures the identity of the speaker and distinguishes the target speaker from other speakers. The computed embedding may then be used as additional information to the audio enhancement machine learning model to extract only the target speaker's voice from any given mixture, in various embodiments.

A neural network trained to generate the embedding as well as the neural network implementing the machine learning model to perform audio enhancement may operate on a perceptually motivated feature representation, such as an equal rectangular bandwidth (ERB) spectrum, as discussed below. For example, the input features may include perceptually relevant parameters like the spectral envelope and the signal periodicity, and may allow for techniques that operate on a compact dimensional feature space (e.g., a 68 dimensional feature space). Implementing real-time audio enhancement for target speaker techniques in this way leads to superior speech enhancement in, for example, noisy multi-talker scenarios, both in terms of subjective listening tests and in terms of objective evaluation metrics.

In various embodiments, audio data may be modeled or represented as an audio signal. For example, in some embodiments, x(n) may represent a clean audio (e.g., speech signal). In various embodiments, audio signals may be captured by audio sensors, such as a hands-free microphone in a noisy room. The audio signal captured by an audio signal may be captured in a noisy environment, and the audio signal model may account for the noisy environment, such as in the scenario of the hands-free microphone given above, by representing the audio signal as y(n)=x(n)*h(n)+η(n), where η(n) is the additive noise from the room, h(n) is the impulse response from a talker to the microphone, and * denotes the convolution. Furthermore, the clean audio can be represented as x(n)=p(n)+u(n), where p(n) is a locally periodic component and u(n) is a stochastic component. In some embodiments, transients such as stops may be considered as part of the stochastic component.

In various embodiments, enhanced audio data may be represented as x̂(n)=p̂(n)+û(n) which may be as perceptually close to the clean speech x(n) as possible. Separating the stochastic component u(n) from the environmental noise η(n) may be performed as û(n) can be made to sound like u(n), in various embodiments, by filtering the mixture u(n)*h(n)+η(n) to have the same spectral envelope as u(n). Since p(n) is periodic and the noise may be assumed not to have strong periodicity, p̂(n) can be estimated. In various embodiments, p̂(n) may have the same spectral envelope and the same period as p(n). In various embodiments, an enhanced audio signal can be constructed using the same spectral envelope, and frequency-dependent periodic-to-stochastic ratio, as the clean signal. For both these properties, a resolution may be used that matches human perception. In various embodiments, an STFT may be used to provide this resolution (e.g., with 20-ms windows and 50% overlap), such as the STFT illustrated in FIG. 3.

Figure 3A:
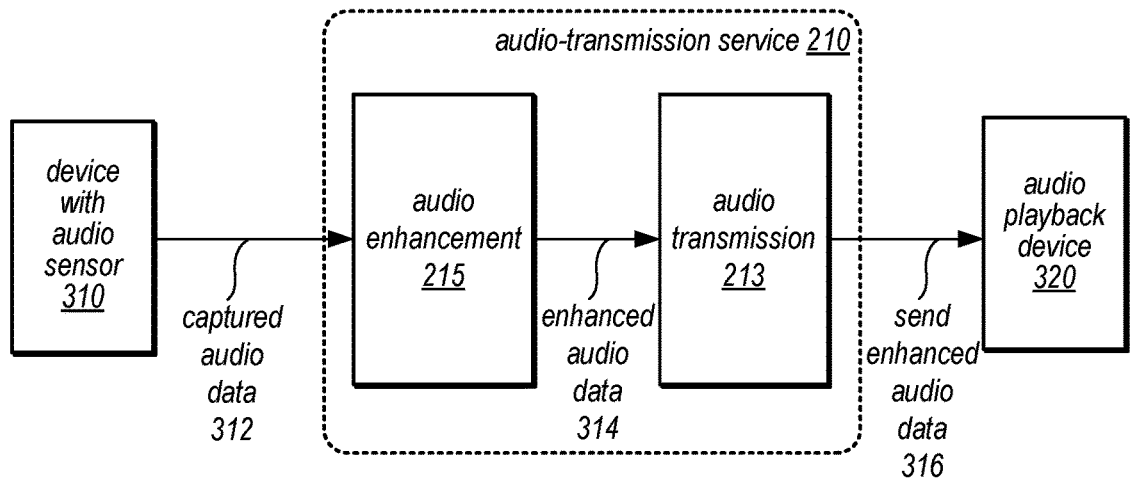
FIGS. 3A-3C illustrate logical block diagrams of different interactions of an audio sensor with provider network services, according to some embodiments.

FIG. 1 illustrates a logical block diagram of real-time target speaker audio enhancement, according to some embodiments. Audio enhancement system 100 may be implemented as part of various network-based systems or services or stand-alone systems, that receive audio data 110 (e.g., speech audio, which may include target speaker audio 112 and various background audio, such as background speaker audio 111a, 111b, and 111c) and provide as output enhanced audio 132 (e.g., enhancing a target speaker). For example, an audio enhancement system 100 may be implemented "service-side," as illustrated in FIG. 3A, where the audio sensor that captures the audio data may be separate from a service or system that implements audio enhancement system 100. In such embodiments, the audio data may be sent from the audio sensor (e.g., over a network connection) to the system or service for audio enhancement. In other embodiments, audio enhancement system 100 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

Audio enhancement system 100 may implement various types of audio enhancement pipelines, such as the example of an audio enhancement pipeline(s) discussed below with regard to FIGS. 4-6. For example, audio enhancement system may implement various signal deconstruction techniques and analysis may be implemented. Signal deconstruction and analysis may include, for instance, various stages or operations for determining or extracting different spectrum bands using techniques such as STFT. Signal deconstruction and analysis may include operations or stages for various other types of audio enhancement operations, such as pitch analysis and pitch filtering, in some embodiments. Signal deconstruction may also produce various features including a respective bands of an ERB spectrum as well as other features like pitch filtering.

In at least some embodiments, a machine learning model to enhance speaker audio 120 may be described as follows, and is described in more detail below with regard to FIGS. 4 and 6. For example, machine learning model 120 may operate on 10-ms frames with 30 ms of look-ahead and enhances 48 kHz speech in real-time. In various embodiments, machine learning model 120 may utilize a perceptual band representation as the feature space, (ii) a perceptually motivated pitch-filter and (iii) an RNN model to estimate band ratio masks. Feature Space: Instead of operating on Ftheier transform bins (like many other speech enhancement methods), machine learning model 120 may operate on only 32 triangular spectral bands, spaced according to the ERB scale. The input features used by machine learning model 120 may be tied to these 32 ERB bands. For each band, two features: the magnitude of the band and the pitch coherence (frequency-dependent voicing) may be used. Four general features may also be included (including the pitch period), resulting in a 68 dimensional feature space, in some embodiments.

To reconstruct the harmonic properties of the clean speech from the spectral envelopes, machine learning model 120 may also employ a comb filter controlled by the pitch frequency, in some embodiments. Such a time-domain comb filter allows a much finer frequency resolution than would otherwise be possible with the STFT (50 Hz using 20-ms windows). The comb filter's effect may be independently controlled in each band using pitch-filter strength parameters.

In various embodiments, machine learning model 120 may be a deep neural network, such as a recurrent neural network (RNN) to estimate a ratio mask in each band. This ratio mask can also be interpreted as the corresponding gain that needs to be applied to the noisy signal to match the clean target's spectral envelope. Along with gains, the model may also output the estimated pitchfilter strength for each band and a frame-level Voice Activity Detector (VAD) output.

As discussed in detail below with regard to FIGS. 4-8, machine learning model 120 may concatenate audio input features with an embedding of a target speaker, as indicated at 121. For example, target speaker embedding generation 140 may obtain an audio sample for speaker 142, generate an embedding using a trained machine learning model, such as a speaker embedder network, as discussed below with regard to FIG. 5, and provide the embedding 144 for use when that speaker is utilizing audio enhancement system 100.

Please note that the previous description of real-time target speaker audio enhancement is a logical illustration and thus is not to be construed as limiting as to the implementation of an audio enhancement system.

This specification begins with a general description of a provider network that implements multiple different services, including an audio-transmission service, which may implement real-time target speaker audio enhancement for transmitted audio. Then various examples of, including different components/modules, or arrangements of components/module that may be employed as part of implementing the services are discussed. A number of different methods and techniques to implement real-time target speaker audio enhancement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
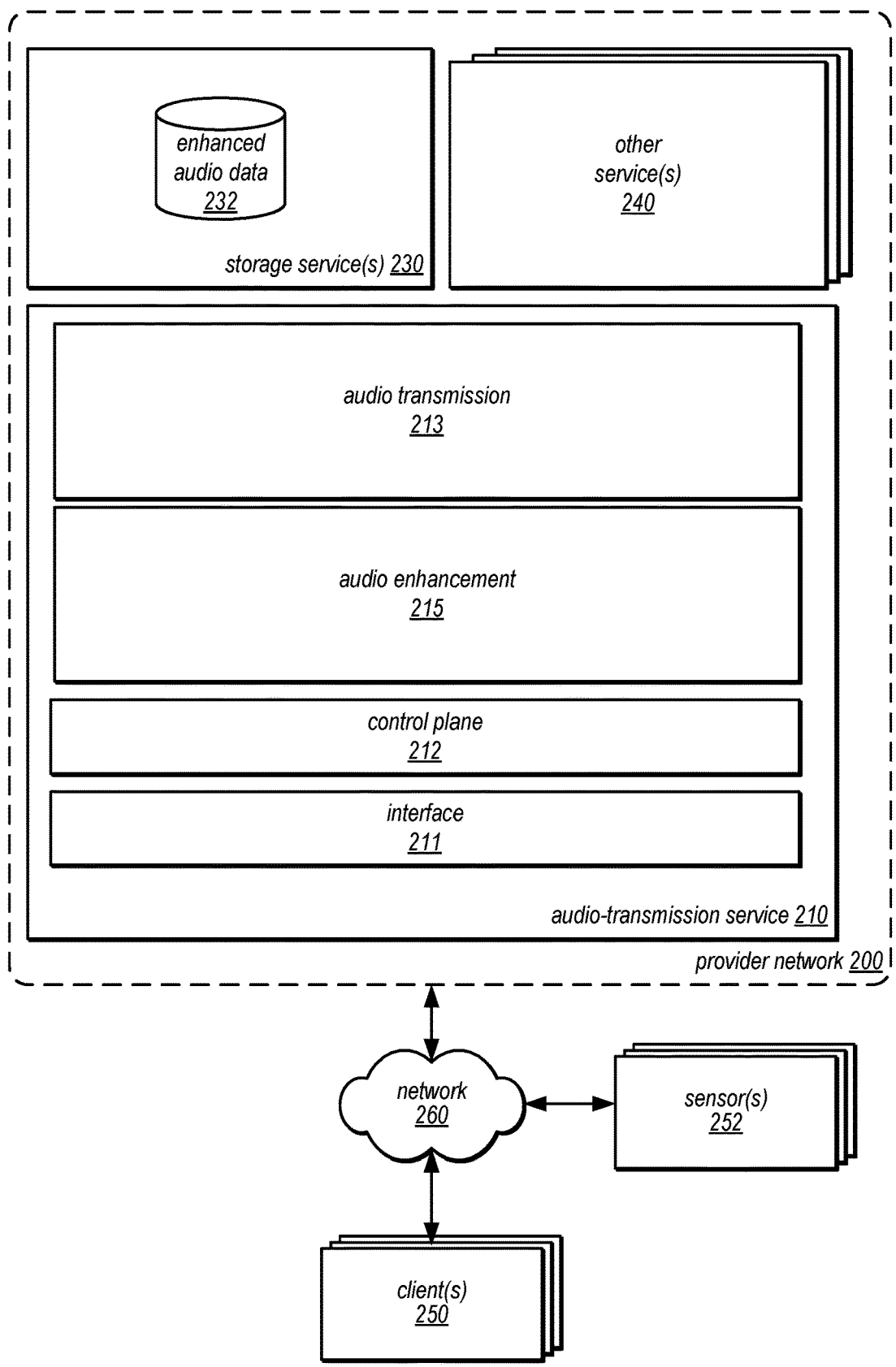
FIG. 2 illustrates an example provider network that may implement an audio-transmission service that implements real-time target speaker audio enhancement, according to some embodiments.

FIG. 2 illustrates an example provider network that may implement an audio-transmission service that implements real-time target speaker audio enhancement, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as audio-transmission service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of audio-transmission service 210 may be implemented by a particular node or may be distributed across several nodes. In some embodiments, a given node may implement the functionality of more than one service system component (e.g., more than one data store component).

Audio-transmission service 210 may implement interface 211 to allow clients (e.g., client(s) 250 or clients implemented internally within provider network 200, such as a client application hosted on another provider network service like an event driven code execution service or virtual compute service) to send audio data for enhancement, storage, and/or transmission. In at least some embodiments, audio-transmission service 210 may also support the transmission of video data along with the corresponding audio data and thus may be an audio/video transmission service, which may perform the various techniques discussed above with regard to FIG. 1 and below with regard to FIGS. 3A-6 for audio data captured along with video data, in some embodiments. For example, audio-transmission service 210 may implement interface 211 (e.g., a graphical user interface, programmatic interface that implements Application Program Interfaces (APIs) and/or a command line interface) may be implemented so that a client application can submit an audio stream captured by sensor(s) 252 to be stored as enhanced audio data 232 stored in storage service(s) 230, or other storage locations or resources within provider network 200 or external to provider network 200 (e.g., on premise data storage in private networks). Interface 211 may allow a client to cause audio enhancement using the techniques discussed above with regard to FIG. 1 and below with regard to FIGS. 3A-6, (e.g., as part of audio transmission, such as voice transmission like Voice over IP (VOIP).

Audio-transmission service 210 may implement a control plane 212 to perform various control operations to implement the features of audio-transmission service 210. For example, control plane 212 may monitor the health and performance of requests at different components audio-transmission 213 and audio enhancement 215 (e.g., the health or performance of various nodes implementing these features of audio-transmission service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 3B:
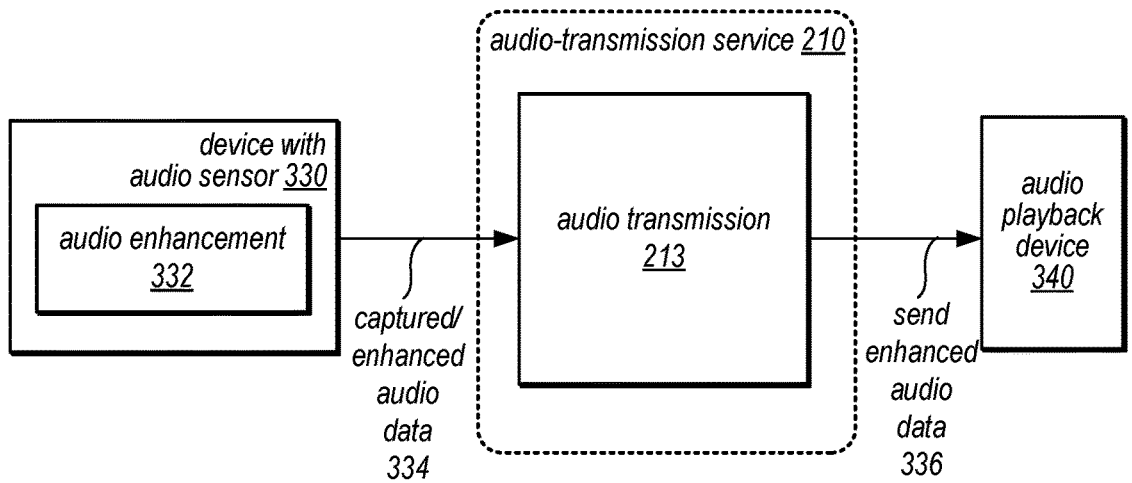

Audio-transmission service 210 may implement audio-transmission 213, which may facilitate audio communications (e.g., for audio-only, video, or other speech communications), speech commands or speech recordings, or various other audio transmissions, as discussed in the examples below with regard to FIGS. 3A and 3B. Audio-transmission service 210 may implement audio enhancement 215 to provide an audio enhancement system (e.g., like audio enhancement system 100 in FIG. 1), which may implement audio enhancement pipelines, like those discussed below with regard to FIGS. 4-5 and techniques like those discussed below with regard to FIG. 6.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Enhanced audio 232 may be put and/or retrieved from data storage service(s) 230 via an interface for data storage services 230, in some embodiments, as discussed below with regard to FIG. 3C.

Generally speaking, clients 250 may encompass any type of client that can submit network-based requests to provider network 200 via network 260, including requests for audio-transmission service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of audio-transmission service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like audio-transmission service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Sensor(s) 252, such as microphones, may, in various embodiments, collect, capture, and/or report various kinds of audio data, (or audio data as part of other captured data like video data). Sensor(s) 252 may be implemented as part of devices, such as various mobile or other communication and/or playback devices, such as microphones embedded in "smart-speaker" or other voice command-enabled devices. In some embodiments, some or all of audio enhancement techniques may be implemented as part of devices that include sensors 252 before transmission of enhanced audio to audio-transmission service 210, as discussed below with regard to FIGS. 3B and 3C.

Figure 3C:
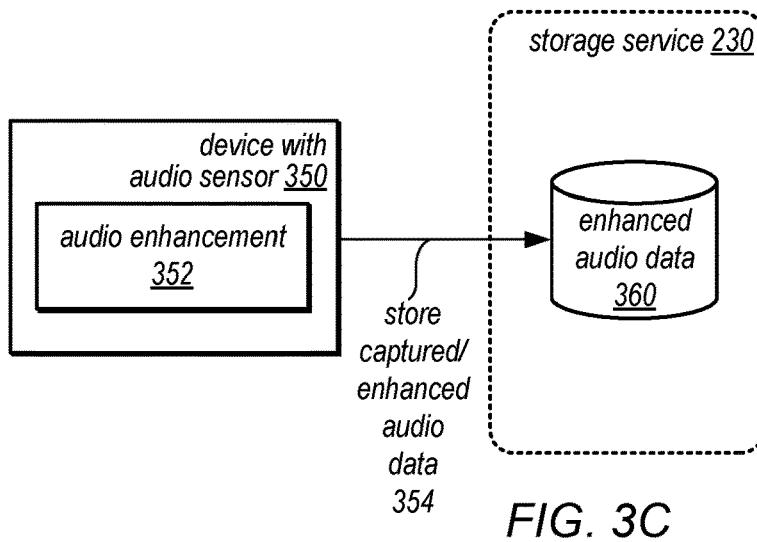

As discussed above, different interactions between sensors that capture audio data and services of a provider network 200 may invoke audio enhancement, in some embodiments. FIGS. 3A-3C illustrate logical block diagrams of different interactions of an audio sensor with provider network services, according to some embodiments. In FIG. 3A, audio sensor 310 may capture audio data from various environments, including speech audio from noisy environments as discussed above with regard to FIG. 1. Device with audio sensor 310 may send directly captured audio data 312 to audio-transmission service 210, in some embodiments, via an interface for audio-transmission service 210 (e.g., interface 211), such as by sending captured audio data 312 over wired or wireless network connection to audio-transmission service 210. In some embodiments, device with audio sensor 310 may provide the captured audio data to another device that sends the capture audio data 312 to audio-transmission service (not illustrated). Capture audio data may be transmitted as an audio file or object, or as a stream of audio, in some embodiments. For instance, for live communications, such as a VoIP call, captured audio data 312 may be a stream of audio data.

Audio-transmission service 210 may process captured audio data 312 through audio enhancement 215, in various embodiments. For example, an audio enhancement pipeline like those discussed below with regard to FIG. 4 may be implemented to provide enhanced audio data 314, including enhanced audio data with target speaker enhancement as discussed above with regard to FIG. 1 and below with regard to FIGS. 4 and 6. Audio transmission 213 may receive the enhanced audio data 314, identify a destination for the enhanced audio, such as audio playback device 320, and send the enhanced audio data 316 to audio playback device 320, in some embodiments. Given the improvements to audio quality provided by audio enhancement, including the reduction of noisy bands with ratio mask post-filtering, audio playback device 320 may play the enhanced audio data 316 to one or more listeners (e.g., which may benefit from the improvements to the captured audio data in the form of more clear and perceptible speech).

Audio enhancement systems may also be implemented separately from audio-transmission service 210, in some embodiments. For example, as illustrated in FIG. 3B, device with audio sensor 330 may also implement audio enhancement 332, which may be an audio enhancement pipeline like those discussed below with regard to FIG. 4 may be implemented to provide enhanced audio data 334, including enhanced audio data with target speaker enhancement as discussed above with regard to FIG. 1 and below with regard to FIGS. 4 and 6. Audio enhancement 332 may be implemented as part of other pre-transmission processing implemented by device with audio sensor 330, such as various encryption, compression, or other operations performed on capture audio data prior to transmission to audio-transmission service 210.

Device with audio sensor 330 may then send the capture/enhanced audio data 334 to audio-transmission service 210 for transmission (e.g., via interface 211), in some embodiments. Audio transmission 213 may receive the enhanced audio data 334, identify a destination for the enhanced audio, such as audio playback device 340, and send the enhanced audio data 336 to audio playback device 340, in some embodiments.

In some embodiments, audio may be stored for later retrieval and/or processing. As illustrated in FIG. 3C, device with audio sensor 350 may also implement audio enhancement 352, which may be an audio enhancement pipeline like those discussed below with regard to FIG. 4 may be implemented to provide enhanced audio data 354, including enhanced audio data with target speaker enhancement as discussed above with regard to FIG. 1 and below with regard to FIGS. 4 and 7. Audio enhancement 352 may be implemented as part of other pre-transmission processing implemented by device with audio sensor 350, such as various encryption, compression, or other operations performed on capture audio data prior to storage in storage service 230. Device with audio sensor 350 may then store the capture/enhanced audio data 354 to storage service 230, which may store enhanced audio data 360 until retrieved for future processing and/or playback, in some embodiments.

Figure 4:
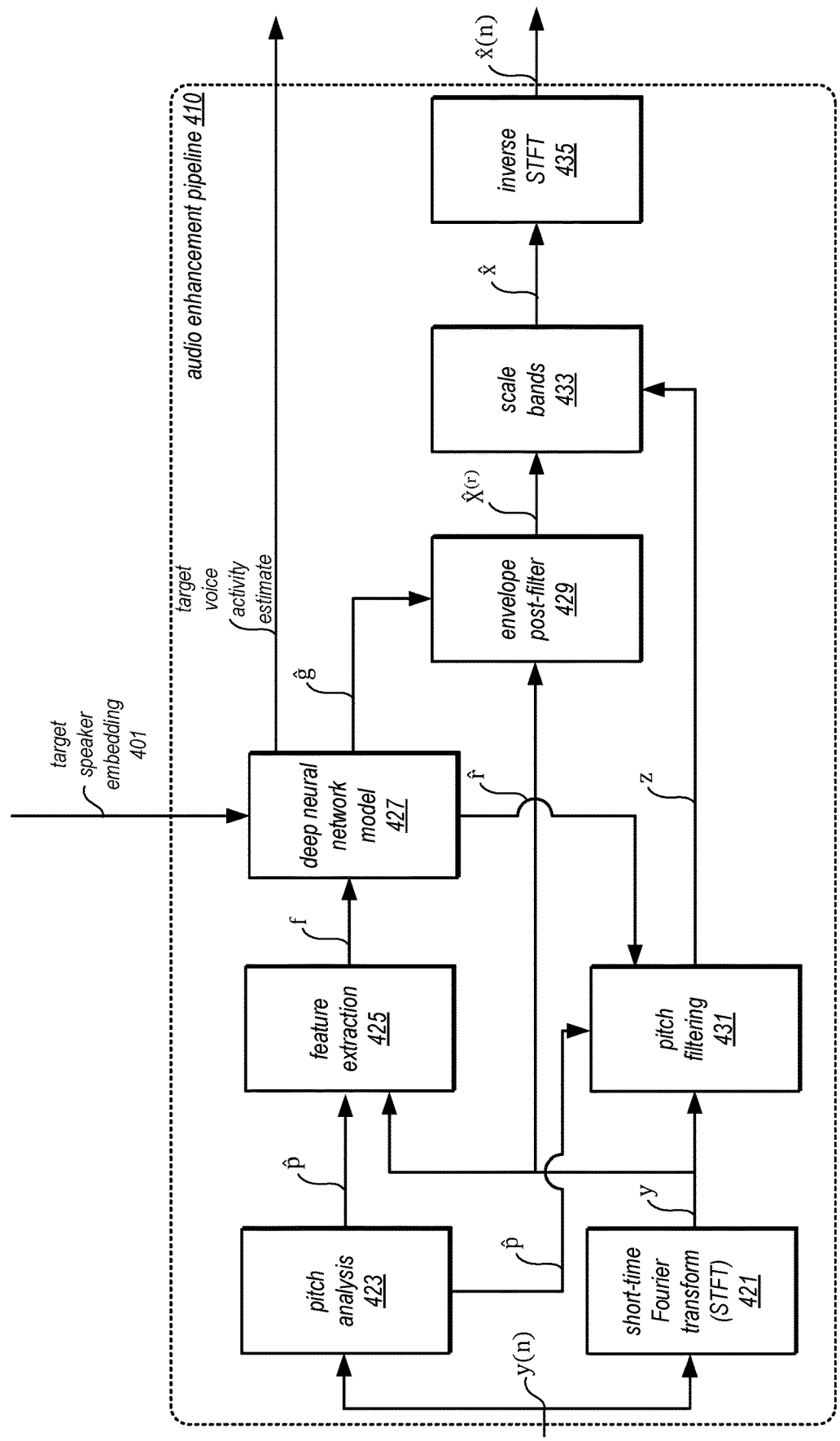
FIG. 4 illustrates a logical block diagram of an example audio enhancement pipeline that may implement real-time target speaker audio enhancement, according to some embodiments.

FIG. 4 illustrates a logical block diagram of an example audio enhancement pipeline that may implement real-time target speaker audio enhancement, according to some embodiments. As discussed above, received audio data may be represented as audio signal y(n). Audio enhancement pipeline 410 may implement STFT 421 to determine different spectrum bands. STFT 421 may provide these spectrum bands y to feature extraction stage 425, pitch filtering stage 431 and envelope post-filter 429, in some embodiments. Audio enhancement pipeline 410 may also implement pitch analysis stage 423, in some embodiments. Pitch analysis 423 may, in some embodiments, provide an approximation $\hat{p}(n)$ of a perfect periodic component p(n) from clean speech, in some embodiments, which may be provided to both feature extraction 425 and pitch filtering 425.

Feature extraction 425 may provide a feature set f for determining the ideal ratio mask of spectrum bands at deep neural network (DNN) model 427. FIG. 4, discussed below, describes the generation of ideal ratio masks by deep neural network model 427 including the concatenation of target speaker embedding 401, which are provided as $\hat{g}$ to envelope post-filter 429. Envelope post-filter 429 may modify the gain values of $\hat{g}$ for the different spectrum bands according to the gain values themselves (e.g., by multiplying the gain values according to a monotonically increasing function that takes, as input the respective gain value). A global gain value may also be applied, in some embodiments. Deep neural network model may also output a target voice activity estimate per frame, indicating whether or not in a frame the target speaker is likely to be speaking.

The filtered audio signal $\hat{X}^{(r)}$ may be provided to scale bands 433, in some embodiments. Scale bands 433 may also, in some embodiments, use the output z of pitch filtering 431. Pitch filtering 431 may, in some embodiments, reconstruct the harmonic properties of clean speech by applying comb filtering based on pitch frequency. Inverse STFT 435 may regenerate the audio signal $\hat{x}$ from scale bands 433 to generate $\hat{x}(n)$, in some embodiments.

To identify the target speaker in a given mixture, access to an audio example of the target speaker's voice may be obtained for an inference. A speaker verification network may be trained that can capture a speaker's identity from a given utterance in the form of a representative speaker embedding. That network is trained once, and then used for any utterance from any target speaker. The target speaker's embedding is then used by PercepNet to distinguish the target speaker from other talkers.

To learn the embedding representation for a target speaker, a speaker verification network may be trained. Speaker verification may be performed to identify whether a given speech example belongs to a particular speaker. In doing so, speaker verification networks have been shown to learn suitable speaker-discriminative embedding representations that have been used for several tasks like target speaker diarization, text-to-speech systems that generate outputs in different target voices, voice style transfer and targeted voice separation. The speaker embedder network, as discussed in detail below with regard to FIG. 5, may be to operate on the same set of features as PercepNet. The audio example may be converted into a feature representation and sent to the SE network. The output of the last frame of the final gated recurrent unit (GRU) may be normalized and chosen to be the corresponding speaker embedding. To train the speaker embedder network network, the generalized end-to-end (GE2E) loss-function may be used.

Speaker embedder networks have been trained on full spectrograms or high-resolution Mel spectrograms to learn discriminative speaker embeddings. Instead, in various embodiments, the speaker embedder network may be trained to learn speaker embeddings from the more compact feature representation described earlier (e.g., the 68 dimensional representation). One reason why a high resolution representation may be unnecessary is the fact that the pitch period for each frame may be explicitly included as a feature, rather than having to be implicitly extracted from the spectrum by the embedding network.

The input to DNN model 427 may be the featurized representation of a speech mixture that contains the target speaker in the presence of concurrent interfering talkers and ambient noise. The speaker embedder network and the given audio example may be used to obtain an embedding representation for the target speaker to isolate. The speaker embedding is then appended to every frame before the GRU layers to train the DNN model 427, the gain and pitch strength loss functions discussed below with regard to PercepNet may be used. Additional supervision may be provided in terms of the voice activity of the target speaker. The VAD output may be expected to produce a value of 1 for frames where the target speaker is active and produce a value of 0 otherwise. The VAD may be treated as a binary classification problem and minimize the binary cross-entropy between the VAD output and the target VAD label. VAD also operates in a personalized manner and can identify frames where the target speaker is active.

Figure 5:
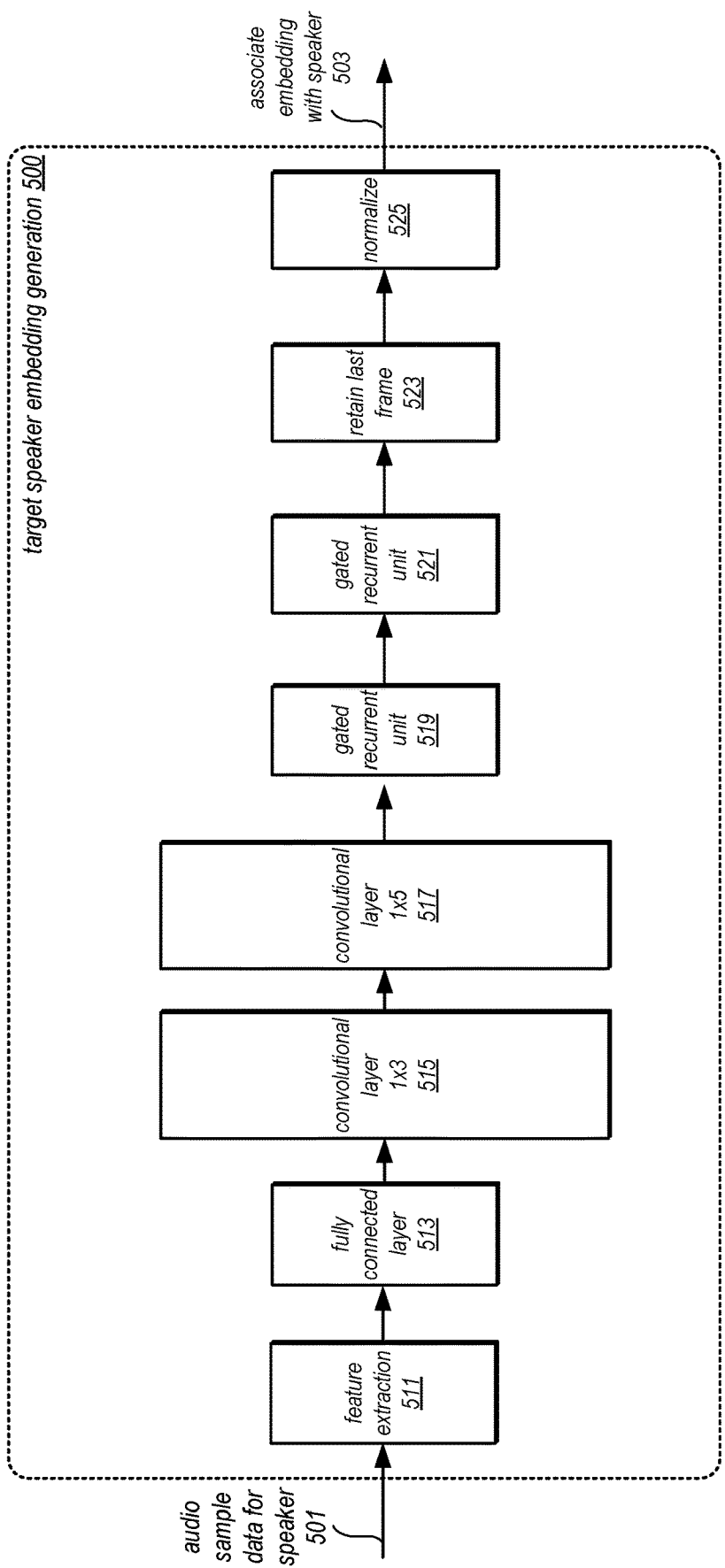
FIG. 5 illustrates a logical block diagram of a speaker embedder network that generates embeddings for a target speaker for audio enhancement, according to some embodiments.
Figure 6:
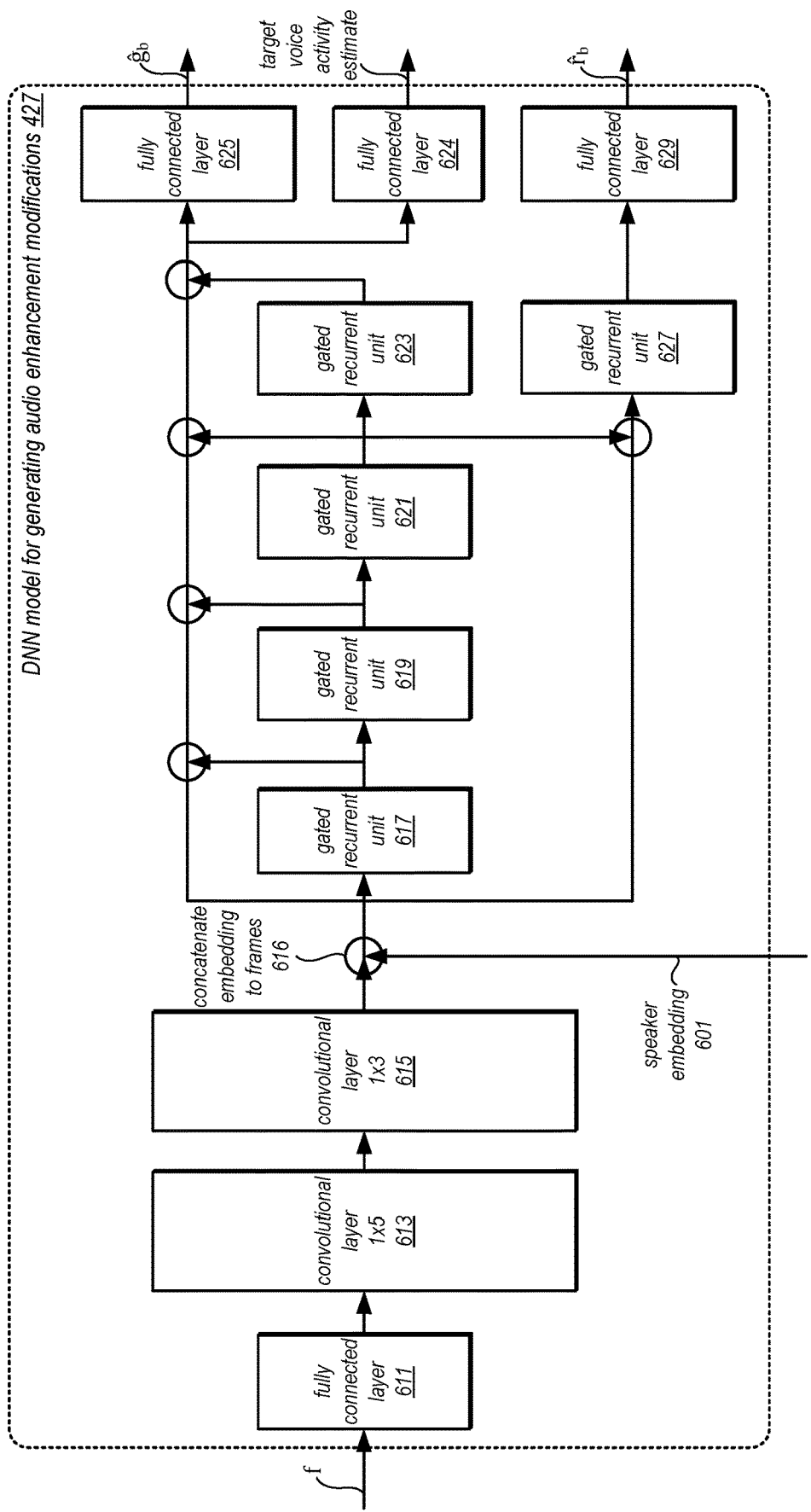
FIG. 6 illustrates a logical block diagram for a machine learning model that determines modifications to enhance speaker audio data within audio data, according to some embodiments.

FIG. 5 illustrates a logical block diagram of a speaker embedder network that generates embeddings for a target speaker for audio enhancement, according to some embodiments. Audio sample data for speaker 501, which may be obtained in various ways as discussed below with regard to FIG. 8, may be provided to a feature extraction layer which may utilize the same feature space as the audio enhancement model (e.g., in ERB spectrum, with for other features for a 68 dimensional input). Fully connected layers 513 may pass the input features to convolutional 1×3 layer 515 and then convolutional layer 1×5 layer 517, which may then pass the output through gated recurrent unit 519 and 521 before the last frame is retained at 523 and normalized at 525 to produce the embedding for the target speaker. As indicted at 503, the generated embedding may be associated with the speaker (e.g., in a data store that links the speaker embedding with a user profile, communication session, or other data set that will indicate to use the speaker embedding for audio enhancement as discussed above and below.

Various types of machine learning models may be implemented to determine the modifications to enhance speaker audio within audio data. For example, deep neural networks, like an RNN as discussed above, may be used. FIG. 6 illustrates a logical block diagram for a machine learning model that determines modifications to enhance speaker audio data within audio data, according to some embodiments.

DNN model 427 may receive features f as discussed above with regard to FIG. 4 at a 128 fully connected layer 611, which may then pass to two convolutional layers, a 612, 1×5 convolutional layer 613 followed by a 612, 1×3 convolutional layer 615. As indicated at 616, speaker embedding 601 may be concatenated to individual frames output from convolutional layer 615 and provided to 612 gated recurrent unit (GRU) layers 617, 619, 621, and 623 respectively along with a 34 fully connected layer 625 that outputs the gain values $\hat{g}_b$, and a 128 gated recurrent unit 627 and fully connected layer 629 that outputs $\hat{r}_b$, as shown in FIG. 6. In other embodiments, concatenation may occur at other location(s) in addition to or instead of the location indicated at 616. Fully connected layer 624 may be used to indicate the target voice activity estimate, in various embodiments for an output frame. In some embodiments, the convolutional layers may be aligned in time such as to use up to M frames into the future. To achieve 40 ms look-ahead including the 10-ms overlap, M=3 may be used in some embodiments.

In various embodiments, the input features used by the model may be tied to 34 equivalent rectangular bandwidth (ERB) bands. For each band two features may be used: the magnitude of the band with look-ahead $Y_b$ (l+M) and the pitch period without look-ahead $q_{y,b}$ (l) (the coherence estimate itself uses the full look-ahead). In addition to those 68 band-related features, the pitch period T (l) may be used, as well as an estimate of the pitch correlation with look-ahead, for a total of 70 input features. For each band b, there may be 2 outputs: the gain $\hat{g}_b$(l) approximates $g_b^{(att)}$(l)$g_b$(l) and the strength $\hat{r}_b$ (l) approximates $r_b$ (l).

The weights of the model may be forced to a ±½ range and quantized to 8-bit integers, in some embodiments. This reduces the memory requirement (and bandwidth), while also reducing the computational complexity of the inference by taking advantage of vectorization.

In various embodiments, a loss function for the gain may consider that the perceptual loudness of a signal may be proportional to its energy raised to a power γ/2, (e.g., γ=0.5). The gains may be raised to the power γ before computing the metrics, in some embodiments. In addition to the squared error, the fifth power may be used to overemphasize the cost of making large errors (e.g. completely attenuating speech). To incorporate VAD output, the loss function may also include the binary cross-entropy between the VAD output and the target VAD label.

Although FIGS. 2-6 have been described and illustrated in the context of a provider network implementing an audio-transmission service, the various components illustrated and described in FIGS. 2-6 may be easily applied to other systems that implement audio enhancement. As such, FIGS. 2-6 are not intended to be limiting as to other embodiments of ratio mask post-filtering for audio enhancement.

Figure 7:
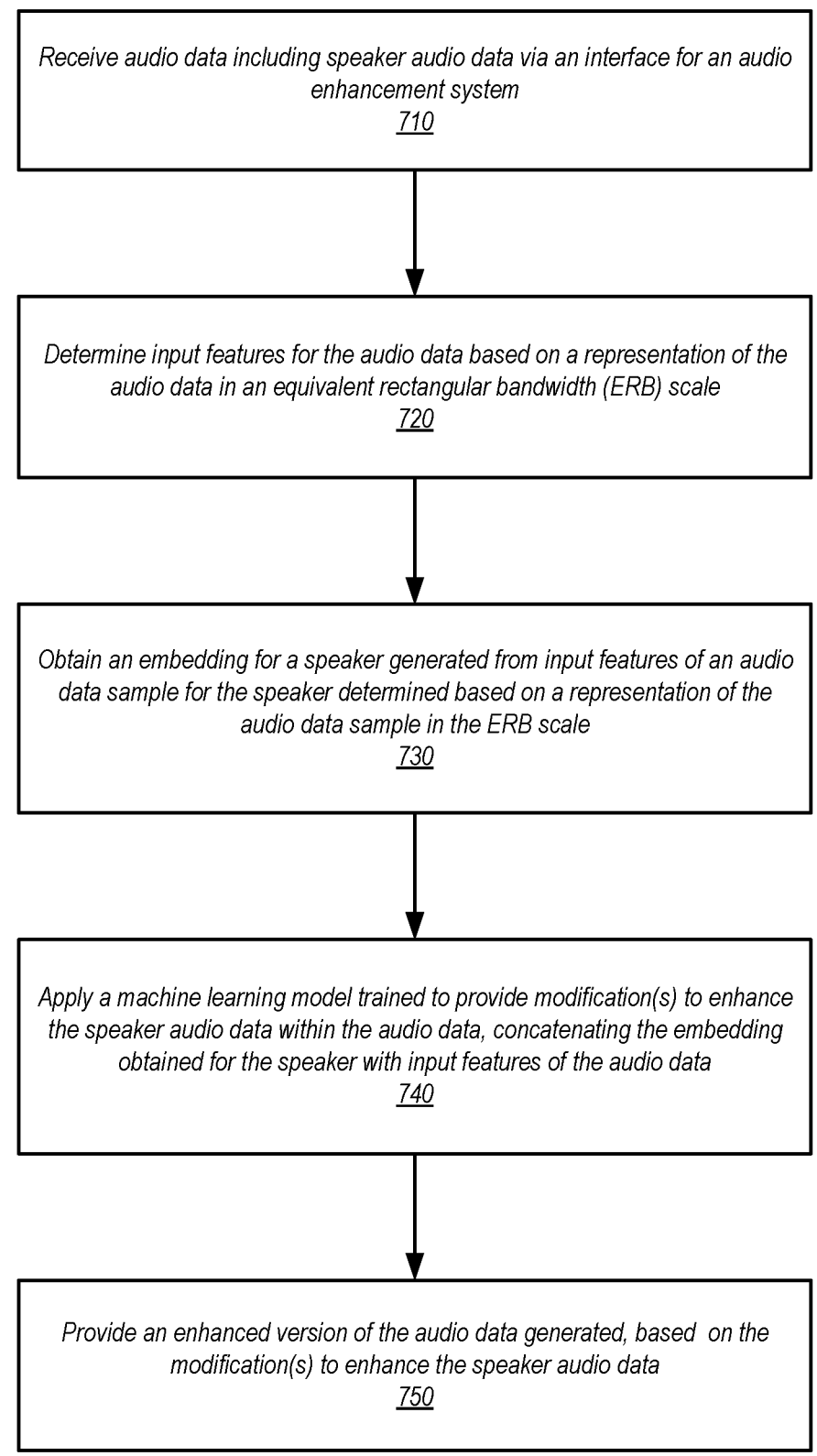
FIG. 7 illustrates a high-level flowchart of various methods and techniques to implement real-time target speaker audio enhancement, according to some embodiments.

FIG. 7 illustrates a high-level flowchart of various methods and techniques to implement real-time target speaker audio enhancement, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 710, audio data may be received that includes speaker audio data via an interface for an audio enhancement system. For example, the audio may be received from an audio sensor, as discussed above with regard to FIGS. 2-3A and provided to a provider network service, like audio-transmission service 210, or may be received at an audio enhancement system implemented as part of an edge or other device that performs audio enhancement before transmitting the enhanced audio data to a provider network service, as discussed above with regard to FIGS. 3B-3C, or may be recorded, uploaded, or otherwise submitted to another system that implements audio enhancement, as discussed above with regard to FIG. 1. In some embodiments, the audio data may be encrypted and/or compressed when received. Accordingly, the received audio data may be decrypted and decompressed by the audio enhancement system.

As indicated at 720, input features for the audio data may be determined based on a representation of the audio data in an equivalent rectangular bandwidth (ERB) scale, in some embodiments. Other features, as discussed above may also be included (e.g., pitch filtering). As indicated at 730, an embedding may be obtained for a speaker generated from input features of an audio data sample for the speaker determined based on a representation of the audio data sample in the ERB scale. Like the input features above for the audio data, other features above may also be included (e.g., pitch filtering) to generate the embedding, such as the speaker embedder network using the techniques discussed above with regard to FIG. 5. In some embodiments, the embedding may be generated at an edge device (e.g., a sensor) and provided to a service or other implementation of the audio enhancement system (e.g., a service as part of a provider network).

As indicated at 740, a machine learning model trained to provide modification(s) to enhance the speaker audio data within the audio data may be applied, concatenating the embedding obtained for the speaker with input features of the audio data. For example, each input frame may be concatenated with the embedding and processed through a deep neural network model, like deep neural network model 427 as discussed above with regard to FIGS. 4 and 6, which may produce gain modifications to be applied (e.g., at envelope post-filter 429 in FIG. 4). An output of target speaker estimate (e.g., VAD) may also be provided, in some embodiments.

As indicated at 750, an enhanced version of the audio data generated, based on the modifications to enhance the speaker audio data may be provided (e.g., stored, transmitted, or otherwise communicated), in some embodiments (e.g., as discussed above with regard to FIGS. 1-3C). For example, the enhanced version of the audio may be sent by an audio (or audio-video) transmission service to another as part of a two-way audio or video communication between devices that capture, send, and receive audio data. In some embodiments, the enhanced audio data may be stored for subsequent access or replay.

Figure 8:
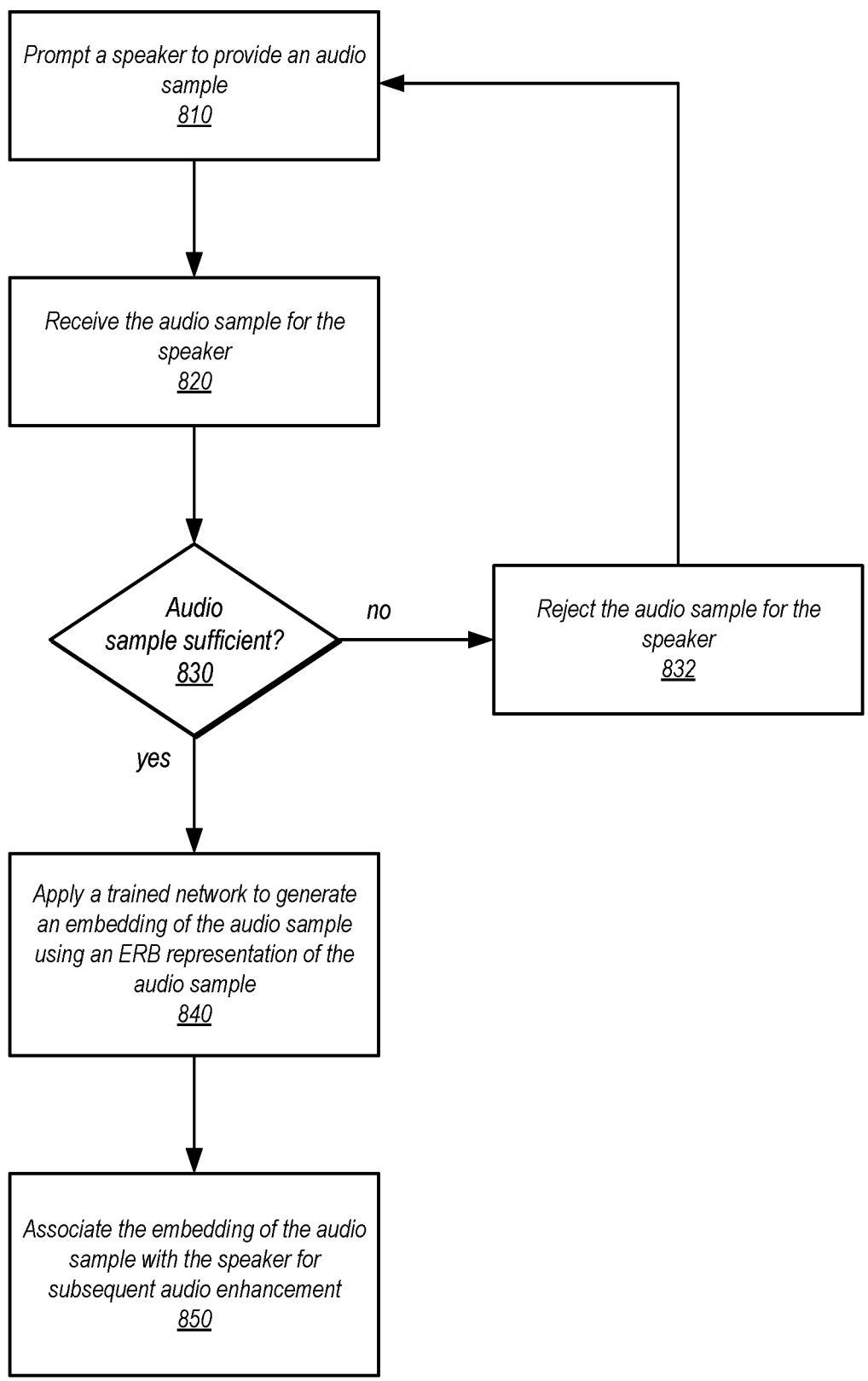
FIG. 8 illustrates a high-level flowchart of various methods and techniques to implement generating a target speaker embedding for target speaker audio enhancement, according to some embodiments.

FIG. 8 illustrates a high-level flowchart of various methods and techniques to implement generating a target speaker embedding for target speaker audio enhancement, according to some embodiments. As indicated at 810, a prompt for a speaker to provide an audio sample may be made (e.g., via visual or audio interfaces). In some embodiments, the audio sample may be prompted as part of a registration process or taken (if granted user permission) from previously provided user audio data of the speaker.

As indicated at 820, the audio sample may be received for the speaker (e.g., via a recording device, sensor, as discussed above, and/or by selecting a previously recorded file). An analysis may be performed, as indicated at 830, as to whether the audio sample is sufficient. For example, a minimum length or clarity of recording may be enforced. If insufficient, then as indicated at 832 the audio sample may be rejected. A prompt for the speaker to provide audio sample may be repeated, in some embodiments.

If the audio sample is sufficient, then, as indicated 840, a trained speaker embedder network may be applied to generate an embedding of the audio sample using an ERB representation of the audio sample, as discussed in detail above with regard to FIGS. 1, 5, and 7. Then, as indicated at 850, the embedding of the audio sample may be associated with the speaker for subsequent audio enhancement, in some embodiments. For example, the embedding may be stored in a data store that links the speaker embedding with a user profile, communication session, or other data set that will indicate to use the speaker embedding for audio enhancement for the speaker.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
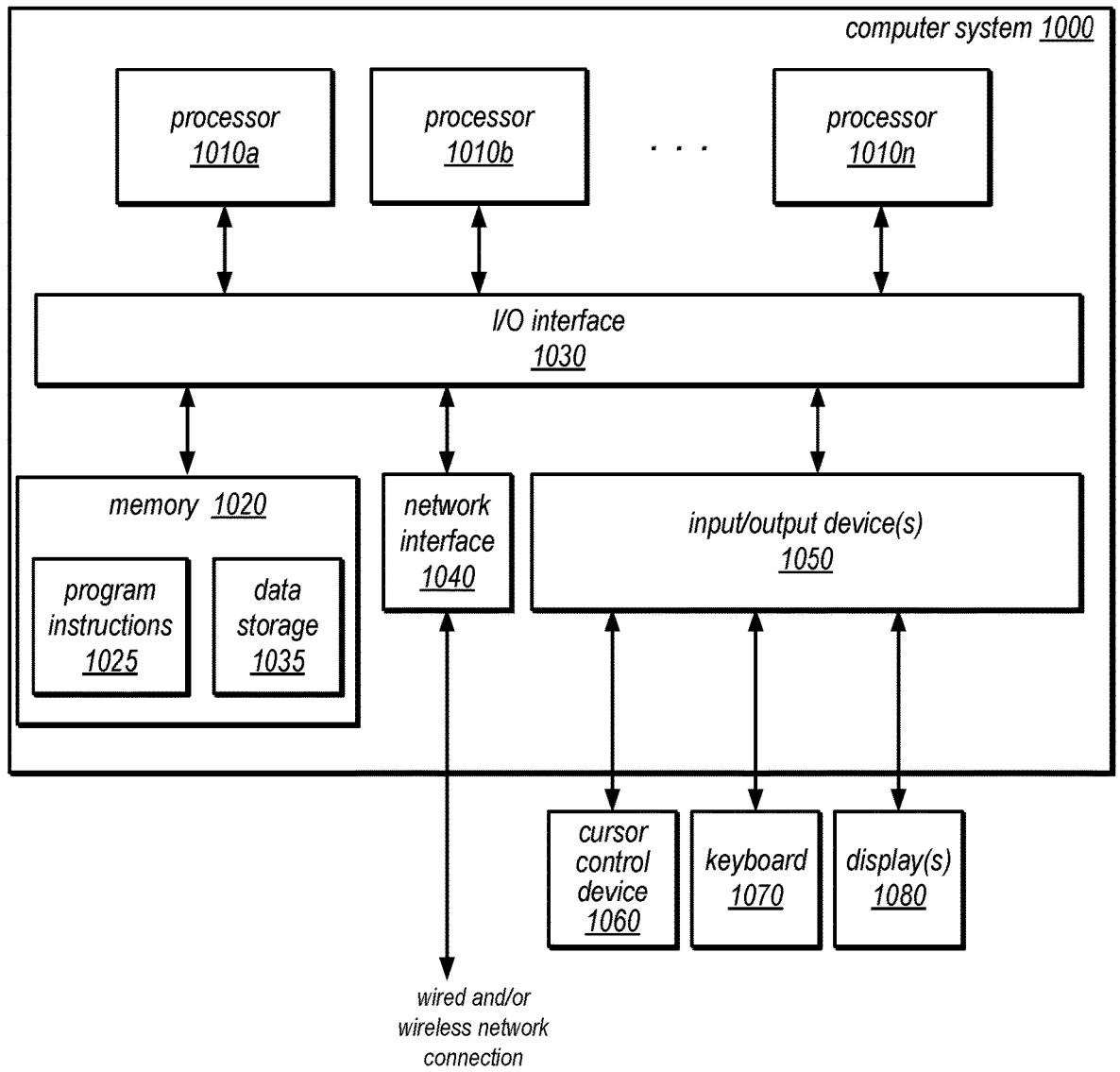
FIG. 9 illustrates an example system to implement the various methods, techniques, and systems described herein, according to some embodiments.

Embodiments of real-time target speaker audio enhancement as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an audio enhancement system, the audio enhancement system configured to:
   receive audio data comprising speaker audio data via an interface for the audio enhancement system;
   determine a plurality of input features for the audio data based on a representation of the audio data in an equivalent rectangular bandwidth scale;
   obtain an embedding for a speaker generated from input features of an audio data sample for the speaker determined based on a representation of the audio data sample in the equivalent rectangular bandwidth scale;
   apply a machine learning model trained to provide one or more modifications to enhance the speaker audio data within the audio data, wherein the machine learning model concatenates the embedding for the speaker with input features of the audio data to determine respective gain values for respective bands of the representation of the audio data in the equivalent rectangular bandwidth scale;
   apply the one or more modifications to the audio data to generate an enhanced version of the audio data according to the respective gain values for the respective bands of the representation of the audio data in the equivalent rectangular bandwidth scale; and
   send, via the interface of the audio enhancement system, the enhanced version of the audio data to a destination.

2. The system of claim 1, wherein to obtain the embedding for the speaker, the audio enhancement system is configured to:
   receive the audio data sample for the speaker via the interface; and
   apply a speaker embedder network to the input features of the audio data sample to generate the embedding from a normalized last frame of the audio data sample output from the speaker embedder network.

3. The system of claim 1, wherein the system further comprises an audio sensor that captures the audio data and wherein the destination is an audio-transmission service implemented as part of a provider network that transmits the enhanced version of the audio data to an audio playback device over a network connection.

4. The system of claim 1, wherein the audio enhancement system is implemented as part of an audio-transmission service offered by a provider network, wherein the interface for the audio enhancement system supports receiving the audio data via a network connection, and wherein the destination is an audio playback device identified by the audio-transmission service for the audio data.

5. A method, comprising:
   receiving audio data comprising speaker audio data via an interface for an audio enhancement system;
   applying, by the audio enhancement system, a machine learning model trained to provide one or more modifications to enhance the speaker audio data within the audio data, wherein the machine learning model:
   concatenates an embedding generated for a speaker with input features of the audio data to determine respective gain values for respective bands of a representation of the audio data in an equivalent rectangular bandwidth scale; and
   wherein the input features of an audio data sample for the speaker used to generate the embedding are determined based on a further representation of the audio data sample in the same equivalent rectangular bandwidth scale; and
   providing, by the audio enhancement system, an enhanced version of the audio data generated, based on the one or more modifications to enhance the speaker audio data according to the respective gain values for the respective bands of the representation of the audio data in the equivalent rectangular bandwidth scale.

6. The method of claim 5, further comprising:
   receiving the audio data sample for the speaker via the interface; and
   applying a speaker embedder network to the input features of the audio data sample to generate the embedding from a normalized last frame of the audio data sample output from the speaker embedder network.

7. The method of claim 6, further comprising prompting the speaker to provide the audio data sample via the interface.

8. The method of claim 7, further comprising rejecting a previously provided audio data sample for the speaker before prompting the speaker to provide the audio data sample.

9. The method of claim 5, wherein applying the machine learning model trained to provide one or more modifications to enhance the speaker audio data within the audio data further comprises determining an activity estimate for the speaker for respective frames of the audio data.

10. The method of claim 5, further comprising receiving, via the interface for the audio enhancement system, the embedding for the speaker.

11. The method of claim 5, wherein the audio data is captured along with corresponding video data that is provided to a same destination as the enhanced version of the audio data.

12. The method of claim 5, wherein providing the enhanced version of the audio data comprises storing the enhanced version of the audio data to a data storage service offered by a provider network.

13. The method of claim 5, wherein the audio enhancement system is implemented as part of a device that includes an audio sensor that captured the audio data, and wherein providing the enhanced version of the audio data comprises sending the enhanced version of the audio data to an audio-transmission service implemented as part of a provider network that transmits the enhanced version of the audio data to an audio playback device over a network connection.

14. One or more non-transitory, computer-readable storage media, storing program instructions that when executed on or across one or more computing devices cause the one or more computing devices to implement:
   receiving audio data comprising speaker audio data via an interface for an audio enhancement system;
   causing application of a machine learning model trained to provide one or more modifications to enhance the speaker audio data within the audio data, wherein the machine learning model:

concatenates an embedding generated for a speaker with input features of the audio data to determine respective gain values for respective bands of a representation of the audio data in an equivalent rectangular bandwidth scale; and wherein the input features of an audio data sample for the speaker used to generate the embedding are determined based on a further representation of the audio data sample in the same equivalent rectangular bandwidth scale; and sending, by the audio enhancement system, an enhanced version of the audio data generated, based on the one or more modifications to enhance the speaker audio data according to the respective gain values for the respective bands of the representation of the audio data in the equivalent rectangular bandwidth scale, to a destination.

15. The one or more non-transitory, computer-readable storage media of claim 14, storing further instructions that when executed on or across the one or more computing devices cause the one or more computing devices to further implement:

receiving the audio data sample for the speaker via the interface; and applying a speaker embedder network to the input features of the audio data sample to generate the embedding from a normalized last frame of the audio data sample output from the speaker embedder network.

16. The one or more non-transitory, computer-readable storage media of claim 15, storing further instructions that when executed on or across the one or more computing devices cause the one or more computing devices to further implement prompting the speaker to provide the audio data sample via the interface.

17. The one or more non-transitory, computer-readable storage media of claim 16, storing further instructions that when executed on or across the one or more computing devices cause the one or more computing devices to further implement rejecting a previously provided audio data sample for the speaker before prompting the speaker to provide the audio data sample.

18. The one or more non-transitory, computer-readable storage media of claim 14, wherein, in applying the machine learning model trained to provide one or more modifications to enhance the speaker audio data within the audio data, the program instructions cause the one or more computing devices to determining an activity estimate for the speaker for respective frames of the audio data.

19. The one or more non-transitory, computer-readable storage media of claim 14, wherein the audio enhancement system is implemented as part of a device that includes an audio sensor that captured the audio data, and wherein providing the enhanced version of the audio data comprises sending the enhanced version of the audio data to an audio-transmission service implemented as part of a provider network that transmits the enhanced version of the audio data to an audio playback device over a network connection.

20. The one or more non-transitory, computer-readable storage media of claim 14, wherein the audio data is captured along with corresponding video data that is provided to a same destination as the enhanced version of the audio data.

* * * * *